United States Patent
Sutorius (10) Patent No.: US 7,034,258 B2
(45) Date of Patent: Apr. 25, 2006

(54) HOT RUNNER HEATER DEVICE AND METHOD OF MANUFACTURE THEREOF

(75) Inventor: Richard Sutorius, St. Charles, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 11 days.

(21) Appl. No.: 10/387,930

(22) Filed: Mar. 13, 2003

(65) Prior Publication Data
US 2003/0218006 A1    Nov. 27, 2003

Related U.S. Application Data

(60) Provisional application No. 60/367,414, filed on Mar. 13, 2002.

(51) Int. Cl.
*H05B 3/58* (2006.01)

(52) U.S. Cl. ........................... 219/535; 392/480

(58) Field of Classification Search ............... 392/480; 219/538, 543, 523, 541, 544
See application file for complete search history.

(56) References Cited

U.S. PATENT DOCUMENTS

| 3,425,864 A | 2/1969 | Morey |
|---|---|---|
| 3,968,347 A | 7/1976 | Isoard |
| 4,304,544 A | 12/1981 | Crandell |
| 4,390,485 A | 6/1983 | Yang |
| 4,641,423 A | 2/1987 | Crandell |
| 4,724,305 A | 2/1988 | Iimura et al. |
| 4,776,070 A | 10/1988 | Shibata et al. |
| 4,795,126 A | 1/1989 | Crandell |
| 4,808,490 A | 2/1989 | Tsukuda et al. |

(Continued)

FOREIGN PATENT DOCUMENTS

EP    03120298 B1    12/1988

*Primary Examiner*—Thor S. Campbell
(74) *Attorney, Agent, or Firm*—Harness, Dickey & Pierce, P.L.C.

(57) ABSTRACT

A heater device used for mold injection processes and related method for manufacturing the same is disclosed. The heater device comprises an inner sleeve having a hollow tubular body with opposed flanges formed at either end thereof and a resistive element applied around the body of the inner sleeve. In assembly, the inner sleeve is disposed inside and engaged to an outer sleeve having a hollow tubular body with opposed openings that communicate with a cavity defined between the inner and outer sleeves. The outer sleeve further defines a first aperture for permitting connection of terminal leads to the resistive element inside the outer sleeve during manufacturing. During manufacture, a slurry of ceramic insulation material is injected through a second aperture in order to completely fill the cavity and encase the resistive element.

31 Claims, 5 Drawing Sheets

U.S. PATENT DOCUMENTS

| | | |
|---|---|---|
| 4,888,464 A | 12/1989 | Shibata et al. |
| 5,047,612 A | 9/1991 | Savkar et al. |
| 5,051,086 A | 9/1991 | Gellert |
| 5,176,839 A | 1/1993 | Kim |
| 5,408,070 A | 4/1995 | Hyllberg |
| 5,558,888 A | 9/1996 | Beck |
| 5,569,475 A | 10/1996 | Adas et al. |
| 5,973,296 A | 10/1999 | Juliano et al. |
| 6,043,466 A | 3/2000 | Jenko et al. |
| 6,164,954 A | 12/2000 | Mortazavi et al. |
| 6,305,923 B1 | 10/2001 | Godwin et al. |
| 6,323,465 B1 | 11/2001 | Gellert et al. |
| 6,410,894 B1 * | 6/2002 | Hoffmann et al. ......... 219/543 |
| 6,516,143 B1 * | 2/2003 | Toya et al. ................ 392/480 |
| 2001/0003336 A1 | 6/2001 | Abbott et al. |

* cited by examiner

HOT RUNNER HEATER DEVICE AND METHOD OF MANUFACTURE THEREOF

CROSS-REFERENCE TO RELATED APPLICATION(S)

This application claims the priority of U.S. provisional patent application Ser. No. 60/367,414, filed Mar. 13, 2002, which is herein incorporated by reference.

BACKGROUND OF THE INVENTION

1. Field of the Invention

The present invention relates to heater devices, and more particularly to low profile heater devices. More specifically, the present invention relates to a low profile heater device used in injection molding processing and a related method of manufacture thereof.

2. Prior Art

In a mold injection process, it is important to maintain a resin in a molten state as it flows from a nozzle of an injection molding machine through a hot runner nozzle and into a mold cavity space, wherein the resin is allowed to cool and form an injection-molded article. To maintain this molten state, a heating device is usually provided adjacent to the hot runner nozzle. A typical prior art heating device is found in U.S. Pat. No. 5,051,086 to Gellert which discloses an injection molding nozzle having several layers of steel and ceramic insulating material that surround a coiled electrical heating element. During fabrication, the coils of the heating element are wound around the body of the nozzle and alternating layers of an insulation material are plasma sprayed over the coil to form a thin layer which provides for a completely integral structure. However, fixing the heating element of Gellert requires that the entire nozzle be replaced because of the integral nature of the device.

Other patent references, such as U.S. Pat. No. 5,973,296 to Juliano et al., disclose a tubular heater having a metallic substrate that has a dielectric film layer and a resistive thick film layer applied directly to the exterior cylindrical surface of the tubular substrate by a method of precision fine film printing. Unfortunately, such a method of manufacture does not address heating devices where a thick layer of ceramic insulating material is required to surround the heating element during fabrication.

Therefore, there appears a need in the art for a heater device that is attachable to a hot runner nozzle for maintaining resin in a molten state. Additionally, there appears a need in the art for a method of fabricating a heater device having a thick insulating material for encasing an electrical heating element.

OBJECTS AND SUMMARY OF THE INVENTION

Accordingly, the primary object of the present invention is to provide a low profile heater device that is attachable to the nozzle of a mold injection apparatus.

Another object of the present invention is to provide a method of manufacturing a heater device having a thick insulating material that encases a resistive element thereof.

A further object of the present invention is to provide a method of injecting a slurry of insulation material into an assembled heater device.

Yet a further object of the present invention is to provide a heater device having an outer sleeve attached to an inner sleeve for housing a heating element encased in a thick insulation material.

These and other objects of the present invention are realized in the preferred embodiment of the present invention, described by way of example and not by way of limitation, which provides for a low profile heater device and related method of manufacture thereof.

In brief summary, the present invention overcomes and substantially alleviates the deficiencies in the prior art by providing a low profile heater device and related method of manufacture thereof comprising a tubular, hollow inner sleeve made from a metal having opposing flanged ends and an outer surface coated with a thin thermally applied ceramic insulating material. A resistive heating element is then coiled around the outer surface of the inner sleeve for providing heat to molten resin flowing through a heater nozzle of a mold injection apparatus. The inner sleeve is disposed inside a hollow, tubular outer sleeve having two or more apertures formed through the body of the outer sleeve. In assembly, the flanges of the inner sleeve are positioned between the ends of the outer sleeve and swaged such that a cavity is defined between the inner and outer sleeves. The apertures communicate with the cavity such that one aperture can be used to inject a slurry of insulating material that completely fills the cavity, while the other aperture provides for the passage of terminal leads that are connected to the ends of the resistive heating element.

Additional objects, advantages and novel features of the invention will be set forth in the description which follows, and will become apparent to those skilled in the art upon examination of the following more detailed description and drawings in which like elements of the invention are similarly numbered throughout.

DETAILED DESCRIPTION OF THE INVENTION

Figures 1, 2:
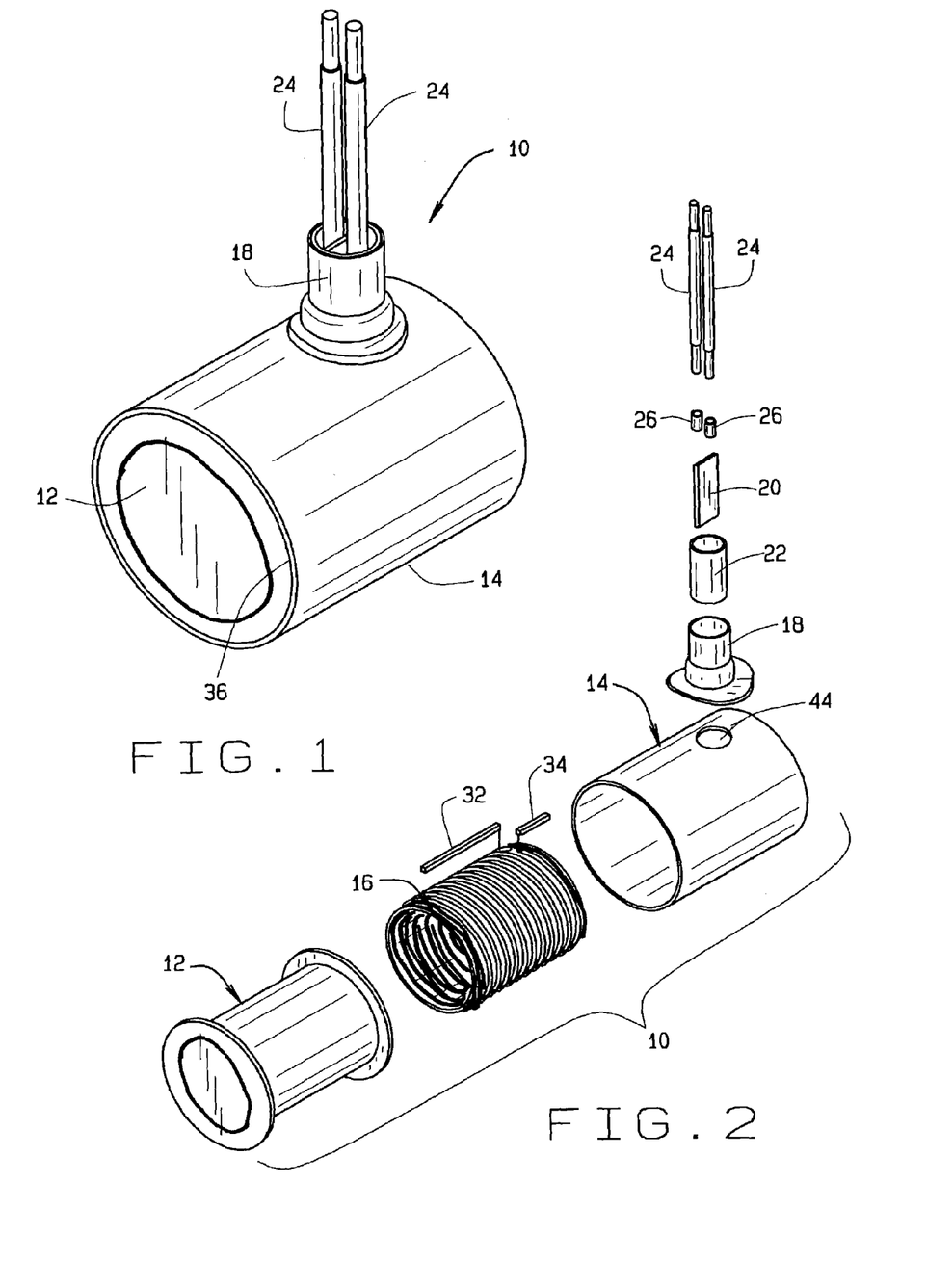
FIG. 1 is a perspective view of a heater device according to the present invention.
FIG. 2 is an exploded view of the heater device according to the present invention.

Referring to the drawings, the preferred embodiment of the heater device of the present invention is illustrated and generally indicated as 10 in FIG. 1. Heater device 10 provides a means for maintaining a resin in a molten state during injection molding processing. Referring to FIGS. 1 and 2, heater device 10 comprises an inner sleeve 12 disposed inside an outer sleeve 14 with a coiled resistive element 16 surrounding the inner sleeve 12. Terminal leads 24 are attached to the resistive element 16 at one end through a first aperture 44 formed through outer sleeve 14 and a source of power (not shown) at the other end thereof. As further shown, a means is provided to properly position terminal leads 24 into outer sleeve 14 such as a lead cap 18. Alternatively, any known means in the art could be used to position terminal leads 24 such as in-line exits (not shown) or flush lead exits (not shown) without departing from the spirit and scope of the present invention.

Figures 3, 4, 5, 6:
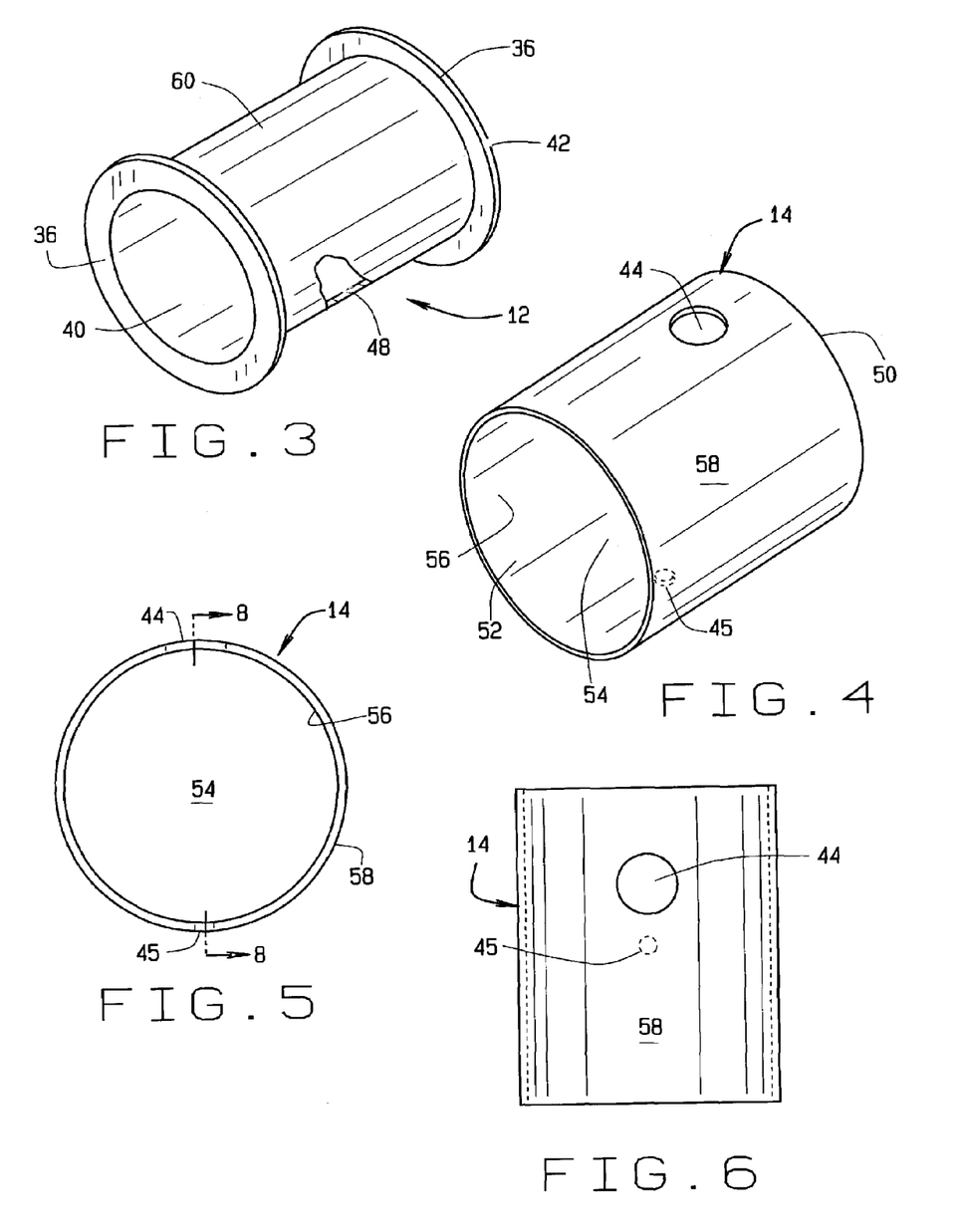
FIG. 3 is a perspective view of an inner sleeve according to the present invention.
FIG. 4 is a perspective view of an outer sleeve according to the present invention.
FIG. 5 is an end view of the outer sleeve according to the present invention.
FIG. 6 is a top view of the outer sleeve according to the present invention.
Figures 7, 8, 9, 10:
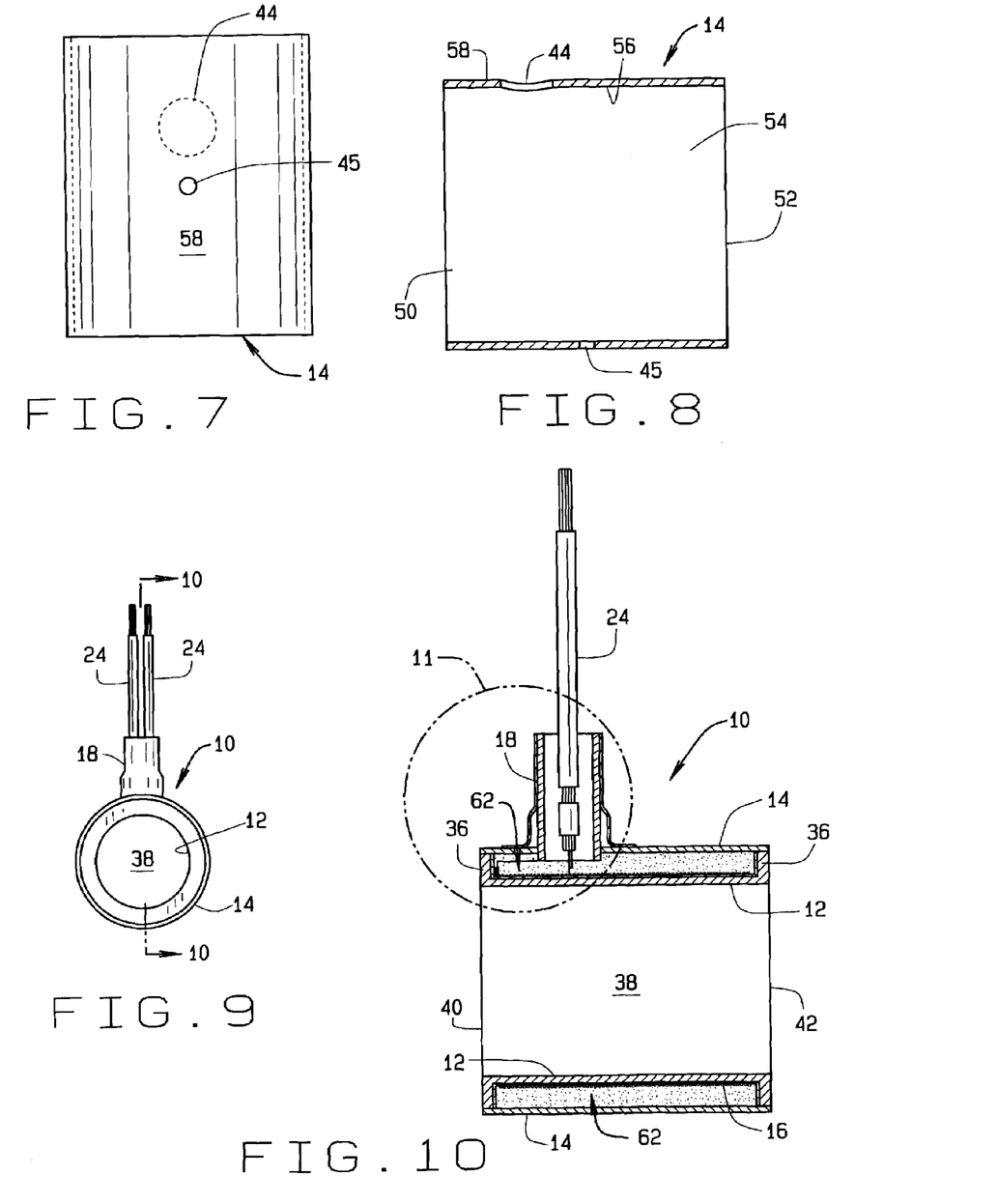
FIG. 7 is a bottom view of the outer sleeve according to the present invention.
FIG. 8 is a cross-sectional view of the outer sleeve taken along line 8—8 of FIG. 5 according to the present invention.
FIG. 9 is an end view of the heater device of FIG. 1 according to the present invention.
FIG. 10 is a cross-sectional view of the heater device taken along line 10—10 of FIG. 9 according to the present invention.
Figure 11:
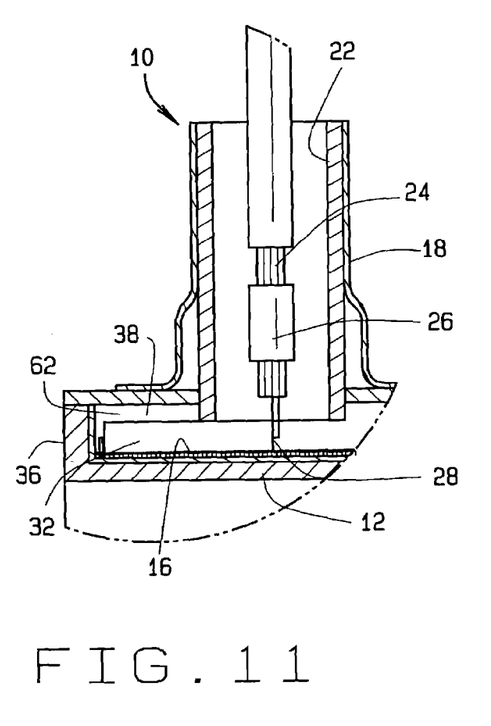
FIG. 11 is an enlarged view of FIG. 10 according to the present invention.
Figure 12:
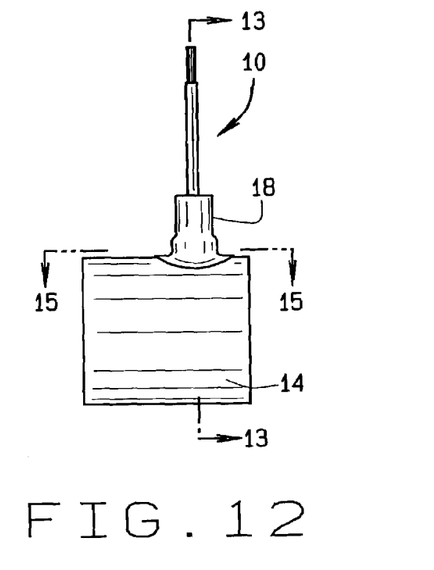
FIG. 12 is a side view of the heater device according to the present invention.
Figure 13:
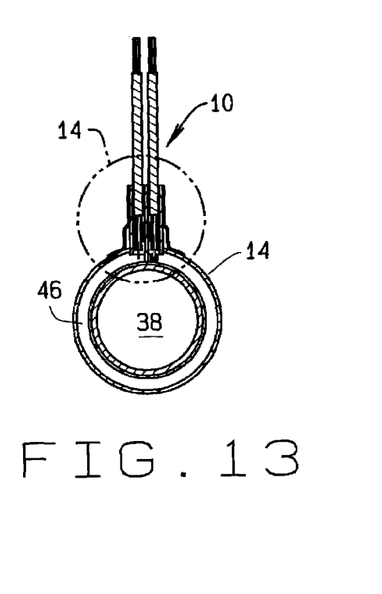
FIG. 13 is a cross-sectional view of the heater device taken along line 13—13 of FIG. 12 according to the present invention.
Figure 17:
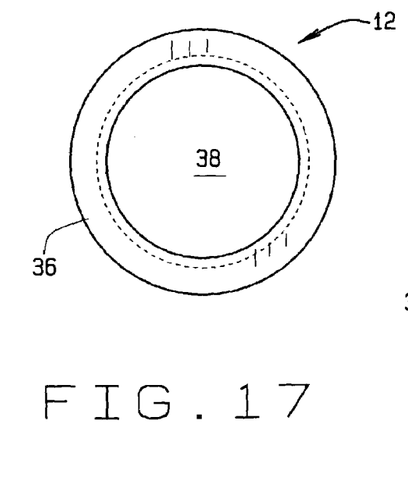
FIG. 17 is an end view of the inner sleeve according to the present invention.
Figure 18:
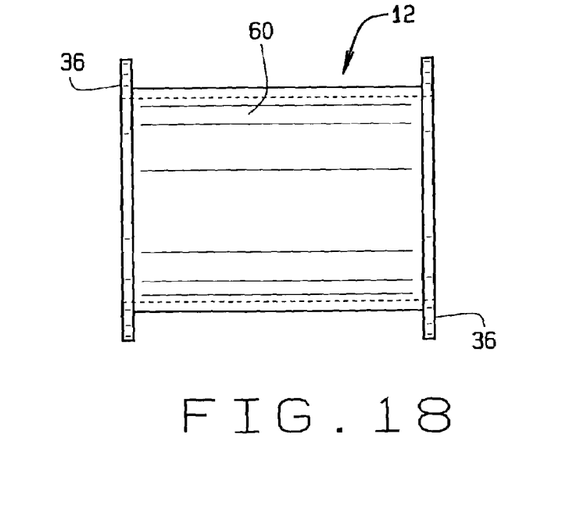
FIG. 18 is a side view of the inner sleeve according to the present invention.

Referring to FIGS. 3, 17 and 18, inner sleeve 12 has a hollow tubular metallic body having an exterior surface 48 with opposing flanges 36 formed at either end of sleeve 12. Opposed openings 40 and 42 are defined adjacent each flange 36 and communicate with a conduit 38 formed through inner sleeve 12. As shall be discussed in greater detail later, a thin layer of ceramic insulation material 60 is preferably thermally applied on the exterior surface 48 to provide a electrically non-conductive surface thereon.

Referring to FIGS. 4–8, outer sleeve 14 has a hollow, tubular body having a substantially similar configuration as inner sleeve 12. Outer sleeve 14 comprises inner and outer surfaces 56 and 58 as well as opposed openings 50 and 52 which communicate with a conduit 54 defined therebetween. Conduit 54 is sized and shaped to receive inner sleeve 12 therein during assembly. As further shown, first and second apertures 44 and 45 are formed through outer sleeve 14 which communicate with conduit 54 in order to access the interior of heater device 10 during manufacturing and assembly as shall be discussed in greater detail below.

Figure 14:
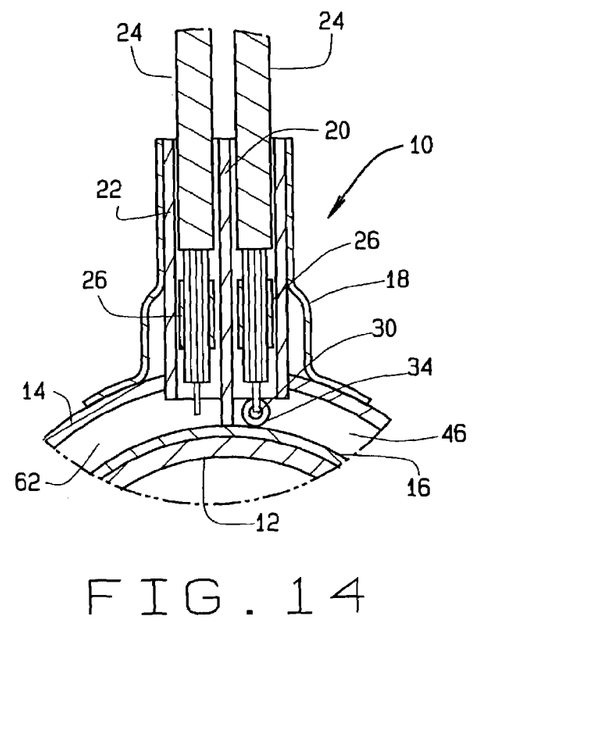
FIG. 14 is an enlarged view of FIG. 12 according to the present invention.
Figure 15:
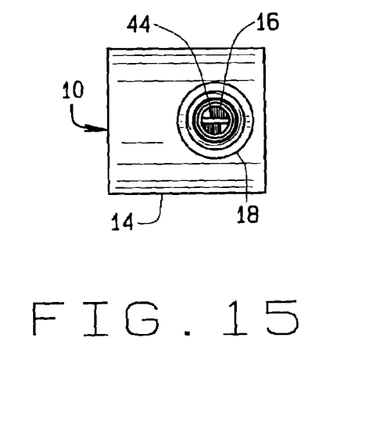
FIG. 15 is a cross-sectional view of the heater device taken along line 15—15 of FIG. 12 according to the present invention.

In assembly, inner sleeve 12 is disposed inside conduit 54 of outer sleeve 14 and flanges 36 welded or otherwise secured to the openings 50 and 52, respectively, such that a cavity 46 is defined between inner and outer sleeves 12 and 14 as illustrated in FIG. 14. Resistive element 16 is coiled around the exterior surface 48 of inner sleeve 12 such that exterior surface 48 is completely surrounded by element 16. A slurry of ceramic insulation material 62 having a consistency of cement is then injected through second aperture 45 until cavity 46 is completely filled with insulation material 62. After it has been allowed to properly set, an electrically insulative barrier is produced between the outer sleeve 14 and the resistive element 16. Terminal leads 24 are then attached to first and second pigtail ends 28 and 30 which are formed along the free ends of resistive element 16 for providing an electrical source to element 16 in the preferred embodiment. In alternative embodiments, terminal leads 24 can be attached to an electric source by any known means in the art to accommodate various gauges of resistive element 16. However, the preferred embodiment of the invention utilizing first and second pigtail ends 28 and 30 will now be discussed in greater detail.

Figure 16:
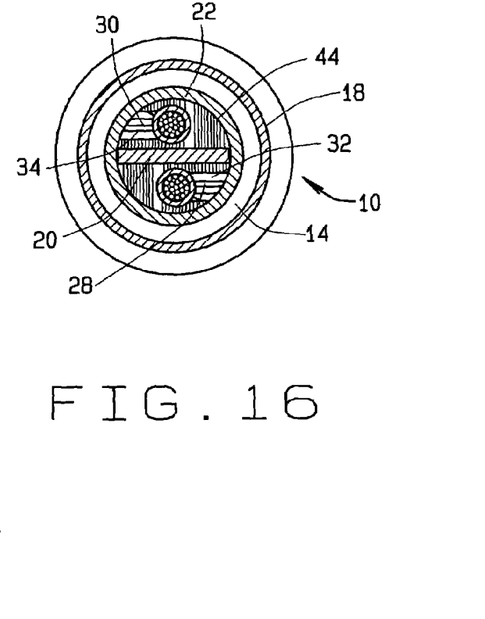
FIG. 16 is an enlarged view of FIG. 15 showing terminal leads according to the present invention.

As illustrated in FIGS. 14 and 16, first and second pigtail ends 28 and 30 are formed from the free ends of the resistive element 16 which have been doubled up into a loop and oriented at a low profile relative to the resistive element 16 in order to secure first and second pigtail ends 28 and 30 to terminal leads 24.

The method of manufacturing heater device 10 according to the present invention shall be discussed in greater detail. As briefly noted above, inner and outer sleeves 12 and 14 as illustrated in FIGS. 3 and 4 are provided for assembly. The exterior surface 48 of inner sleeve 12 is first thermally applied with a thin layer of ceramic insulation material 60 using conventional methods known in the art. Resistive element 16 is then wound around the exterior surface 48 such that inner sleeve 12 is completely surrounded by element 16 between opposing flanges 36. Once the resistive element 16 is completely applied around inner sleeve 12, the free ends of element 16 are doubled up to form first and second pigtail ends 28 and 30 (FIG. 16), respectively.

Referring to FIGS. 9–11 and 14–16, the manufacturer then surrounds first and second pigtail ends 28 and 30 with first and second insulators 32 and 34 in such a manner that ends 28 and 30 extend from flanges 36 of inner sleeve 12 toward the opening 44 formed along the outer sleeve 14 therefrom. First and second insulators 32 and 34 are made from a ceramic insulating material. Preferably, the first and second insulators 32 and 34 are positioned at a low profile along the longitudinal axis of inner sleeve 12. The portions of first and second pigtails 28 and 30 that extend from first and second insulators 32 and 34, respectively, are then bent at a perpendicular angle such that pigtails 28 and 30 can be oriented directly under first aperture 44 during assembly. Preferably, the free ends of the first and second insulators 32 and 34 as well as the last few turns of the resistive element 16 are potted with a slurry of ceramic insulation material 62 in order to better facilitate assembly of heater device 10 and to hold the resistive element 16 in place. The outer sleeve 14 is then slid over the inner sleeve 12 such that the first aperture 44 is properly aligned over the free ends of first and second pigtails 28 and 30. The free ends of first and second pigtails 28 and 30 are fed through first aperture 44 and secured to terminal leads 24 using crimp sleeves 26. Once so secured, a ceramic divider 20 is placed between the secured ends of first and second pigtails 28 and 30, and a ceramic sleeve 22 placed around the secured ends. The ceramic divider 20 provides a means for insulating and separating terminal leads 24 from one another in order to avoid a short circuit of heater device 10, while ceramic sleeve 22 insulates terminal leads 24 from the lead cap 18. Although the divider 20 and sleeve 22 are preferably made from a ceramic material, any suitable insulation material, such as mica, is felt to fall within the scope of the present invention.

Referring to FIGS. 12–15, once the divider 20 and sleeve 22 are in place, hollow lead cap 18 is slid down the terminal leads 24 and attached over first aperture 44 of outer sleeve 14. A slurry of ceramic insulation material 62 is then injected through second aperture 45 such that cavity 46 becomes completely filled with material 62. Finally, the slurry of ceramic insulation material 62 is allowed to cure using methods known in the art.

Preferably, the slurry of insulation material 62 may be a SAUEREISEN® #8 Electrotemp manufactured by Sauereisen Inc. of Pittsburgh, Pa.; however any composition exhibiting suitable insulation characteristics and having a generally cement-like consistency is felt to fall within the scope of the present invention. Furthermore, although the preferred embodiment of the present invention describes the insulation being injected into a cavity any method of applying the cement around the inner sleeve such as before the inner sleeve is surrounded by the outer sleeve would still fall within the present scope of the invention.

Preferably, the heater device 10 of the present invention may have applications related to other processes, such as process heating, metal injection molding, ceramic molding, extrusion die heating, tube heating, and hot melt injections processes are some examples of use of the present invention.

It should be understood from the foregoing that, while particular embodiments of the invention have been illustrated and described, various modifications can be made thereto without departing from the spirit and scope of the invention. Therefore, it is not intended that the invention be limited by the specification; instead, the scope of the present invention is intended to be limited only by the appended claims.

What is claimed is:

1. A heater device comprising:
   an outer sleeve having a tubular body forming opposing openings in communication with a conduit;
   an inner sleeve disposed inside said outer sleeve, said inner sleeve having a hollow, tubular body with an exterior surface having a layer of insulation material, said inner sleeve defining opposing openings;
   a resistive element placed around said inner sleeve; and
   a cavity defined between said inner sleeve and said outer sleeve, said cavity being completely filled with an insulation material that is in direct contact with said outer sleeve and said resistive element and encases said resistive element.

2. The heater device according to claim 1 wherein said outer sleeve defines at least two apertures formed therethrough.

3. The heater device according to claim 1, wherein said resistive element further comprises first and second free ends attached to a pair of respective terminal leads inserted through one of said at least two apertures.

4. The heater device according to claim 2, wherein a lead cap is engaged to one of said at least two apertures.

5. The heater device according to claim 1, wherein said inner sleeve further comprises opposing flange members which are secured to said outer sleeve.

6. The heater device according to claim 3, wherein said resistive element further comprises at least one pigtail member formed along the free ends of said resistive element and attached to said terminal leads.

7. The heater device according to claim 1, wherein said inner and outer sleeves are made of a metallic material.

8. The heater device according to claim 1, said insulation material that encases said resistive element has a cement-like consistency.

9. The heater device according to claim 1 wherein said insulation material is ceramic.

10. The heater device according to claim 8, wherein said insulation material cures over time and temperature.

11. A heater device comprising:
    an outer sleeve having a tubular body forming opposing openings in communication with a conduit, said outer sleeve defining at least two apertures formed therethrough;
    an inner sleeve disposed inside said outer sleeve, said inner sleeve having a hollow, tubular body including opposing openings;
    a resistive element applied around the inner sleeve, said resistive element having first and second free ends attached to a pair of respective terminal leads inserted through one of said at least two apertures; and
    a cavity defined between said inner sleeve and said outer sleeve, said cavity being completely filled initially with a slurry of insulation material that is in direct contact with said outer sleeve and said resistive element and encases said resistive element.

12. The heater device according to claim 11, further comprising a lead cap, said lead cap being engaged with one of said at least two apertures.

13. The heater device according to claim 11, wherein said initial slurry of insulation material cures over time and temperature.

14. A heater device comprising:
    an outer sleeve with an inner and outer surface having a hollow tubular body forming opposing openings defining a conduit therebetween, said outer sleeve defining at least two apertures in communication with said conduit, said at least two apertures having a lead cap attached thereto;
    an inner sleeve with an exterior surface wherein said exterior surface is applied with an insulation material disposed inside said outer sleeve, said inner sleeve having a hollow, tubular body whereby said exterior surface further comprises opposing flanges formed at either end of said inner sleeve including opposing openings in communication with said conduit;
    a resistive element applied around the inner sleeve, said resistive element having a first and second free ends forming pigtail ends which are attached to a pair of respective terminal leads inserted through one of said at least two apertures; and
    a cavity defined between said inner sleeve and said outer sleeve, said cavity being completely filled initially with a slurry of insulation material that is in direct contact with said outer sleeve and said resistive element and encases said resistive element.

15. A method of manufacturing a heater device comprising the steps of:
    a) providing an outer sleeve having a hollow tubular body forming opposing openings, said outer sleeve defining at least two apertures formed therethrough, an inner sleeve disposed inside said outer sleeve having a hollow tubular body with an exterior surface defining opposing openings, the inner and outer sleeves defining a cavity;
    b) applying a resistive element around said inner sleeve;
    c) injecting a slurry of insulation material in one of said at least two apertures; and
    d) allowing said slurry of insulation material to cure.

16. The method according to claim 15 wherein said step of injecting includes injecting said slurry of insulation material into said cavity.

17. A method of manufacturing a heater device comprising the steps of:
    a) providing an outer sleeve having a hollow tubular body forming opposing openings, said outer sleeve defining at least two apertures formed therethrough, an inner sleeve having a hollow, tubular body with an exterior surface defining opposing openings, and a resistive element, said resistive element having first and second free ends;
b) providing said inner sleeve with an insulation material;
c) applying said resistive element around said exterior surface of said inner sleeve;
d) sliding said outer sleeve over said inner sleeve such that a cavity is defined there between;
e) injecting a slurry of insulation material into said cavity through another of said at least two apertures such that said resistive element is encased in said insulation material and said insulation material is in direct contact with said outer sleeve and said resistive element; and
f) curing said slurry of insulation material.

18. The method according to claim 17, further comprising the step of sealing said inner sleeve to said outer sleeve adjacent to said opposed openings such that said inner sleeve is secured to said outer sleeve.

19. The method according to claim 17, wherein said step of providing said inner sleeve with an insulation material is accomplished by thermally applying said inner sleeve with said insulation material.

20. The method according to claim 17, further comprising the step of positioning said resistive element into said at least two apertures formed by said outer sleeve by creating in-line exits for said resistive element.

21. The method according to claim 17, further comprising the step of positioning a portion of said resistive element into said at least two apertures formed by said outer sleeve by creating flush lead exits for said resistive element.

22. A method of manufacturing a heater device comprising the steps of:
a) providing an outer sleeve having a hollow, tubular body forming opposing openings, said outer sleeve defining at least two apertures formed therethrough, an inner sleeve having a hollow, tubular body with an exterior surface defining opposing openings, and a resistive element, said resistive element having free ends;
b) applying said inner sleeve with an insulation material;
c) applying said resistive element around said exterior surface of said inner sleeve;
d) taking up the ends of said resistive element to form first and second pigtail ends;
e) inserting said first and second pigtail ends through first and second insulators, respectively;
f) sliding said outer sleeve over said inner sleeve;
g) securing said first and second pigtail ends to a pair of terminal leads;
h) placing a divider between said first and second pigtail ends;
i) placing a sleeve around said first and second pigtail ends secured to said pair of terminal leads;
j) injecting a slurry of ceramic material into the cavity defined between said inner sleeve and said outer sleeve through one of said at least two apertures; and
k) curing said slurry of ceramic material.

23. The method according to claim 22 further comprising the step of potting the free ends of said first and second insulators with a slurry of ceramic insulation material.

24. The method according to claim 22 wherein the step of potting the last first turns of said resistive element with a slurry of ceramic insulation material holds said resistive element in place.

25. The method according to claim 22 further comprising the step of sliding a hollow lead cap down said terminal leads and attaching it to one of said at least two apertures.

26. The method according to claim 22, further comprising the step of sealing said inner sleeve to said outer sleeve to said opposed openings such that said inner sleeve is secured to said outer sleeve.

27. The method according to claim 22 further comprising the step of feeding said first and second pigtail ends through one of said at least two apertures.

28. The method according to claim 22, wherein said step of sliding said outer sleeve over said inner sleeve is accomplished so that one of said at least two apertures is properly aligned over said first and second pigtail ends.

29. A heater device comprising:
an outer sleeve;
an inner sleeve placed inside the outer sleeve;
a cavity formed between said outer sleeve and said inner sleeve;
a resistive element disposed inside said cavity and around an exterior surface of said inner sleeve; and
an insulation material disposed within the cavity, the insulation material completely encasing said resistive element and being in direct contact with said resistive element and with said outer sleeve.

30. A method of manufacturing a heater device comprising an inner sleeve, an outer sleeve, a cavity formed between the inner sleeve and the outer sleeve and a resistive element disposed inside the cavity and around an exterior surface of the inner sleeve, the method comprising the steps of:
a) injecting a slurry of insulation material into said cavity; and
b) curing said slurry of insulation material.

31. The method of claim 30, wherein the step of injecting a slurry of insulation material into said cavity further comprising the step of substantially filling said cavity to form an insulation layer that contacts said resistive element and said outer sleeve.

* * * * *